(12) United States Patent
Chen

(10) Patent No.: US 8,418,816 B2
(45) Date of Patent: Apr. 16, 2013

(54) BRAKE MECHANISM FOR STROLLER

(75) Inventor: Hong-Bo Chen, Kowloon (HK)

(73) Assignee: BP Children's Products HK Co., Limited, Kwun Tong, Kowloon (HK)

( * ) Notice: Subject to any disclaimer, the term of this patent is extended or adjusted under 35 U.S.C. 154(b) by 282 days.

(21) Appl. No.: 12/818,144

(22) Filed: Jun. 17, 2010

(65) Prior Publication Data

US 2010/0326775 A1    Dec. 30, 2010

Related U.S. Application Data

(60) Provisional application No. 61/221,566, filed on Jun. 30, 2009.

(30) Foreign Application Priority Data

Sep. 30, 2009 (CN) .......................... 2009 1 0179400

(51) Int. Cl.
*B62B 9/08* (2006.01)
(52) U.S. Cl.
USPC ........................................... 188/20; 188/2 D
(58) Field of Classification Search .................... 188/19, 188/20, 30, 31, 60, 63, 2 D, 2 F, 68, 69
See application file for complete search history.

(56) References Cited

U.S. PATENT DOCUMENTS

| 4,953,667 | A | | 9/1990 | Bigo | |
|---|---|---|---|---|---|
| 6,148,942 | A | * | 11/2000 | Mackert, Sr. | ................ 180/65.6 |
| 6,170,615 | B1 | * | 1/2001 | Cheng | .............................. 188/20 |
| 6,341,672 | B1 | * | 1/2002 | Yang et al. | ...................... 188/20 |
| 2007/0051565 | A1 | * | 3/2007 | Chen | .............................. 188/19 |
| 2008/0078630 | A1 | | 4/2008 | Yeh | |

FOREIGN PATENT DOCUMENTS

| CN | 2895186 Y | 5/2007 |
|---|---|---|
| CN | 201189883 Y | 2/2009 |
| CN | 201258004 Y | 6/2009 |

* cited by examiner

*Primary Examiner* — Xuan Lan Nguyen
(74) *Attorney, Agent, or Firm* — Winston Hsu; Scott Margo

(57) ABSTRACT

A brake mechanism is applied to a stroller. The stroller comprises a first wheel. The first wheel has a first hub. The brake mechanism comprises a first wheel base, a ratchet, an operating member and a first engaging member. The first wheel is pivotally connected to the first wheel base. The ratchet is pivotally connected to the first wheel base. The ratchet comprises a plurality of first and second engaging teeth arranged interlacedly. The operating member is pivotally connected to the first wheel base and abuts against the ratchet. The first engaging member is pivotally connected to the first wheel base. When the operating member is pressed to drive the ratchet to rotate, the ratchet drives the first engaging member to move, so that the first engaging member is capable of selectively engaging with one of the first or second engaging teeth.

17 Claims, 13 Drawing Sheets

BRAKE MECHANISM FOR STROLLER

CROSS REFERENCE TO RELATED APPLICATIONS

This application claims the benefit of U.S. Provisional Application No. 61/221,566, which was filed on Jun. 30, 2009, and is incorporated herein by reference.

BACKGROUND OF THE INVENTION

1. Field of the Invention

The invention relates to a brake mechanism for a stroller and, more particularly, to a brake mechanism capable of achieving one-step brake.

2. Description of the Prior Art

There are various brake mechanisms for braking rear wheels of a stroller. For example, a conventional brake mechanism usually utilizes a brake pedal with embedded teeth to cooperate with engaging holes formed on a hub of the rear wheels. The brake mechanism of a conventional stroller usually can only be used to brake left or right wheel independently, so that the stroller may sway, rotate or topple over if the left and right rear wheels cannot be braked simultaneously under a critical situation. For example, it will be very dangerous when the stroller moves on fast or there is a steep incline. Furthermore, a user has to stamp on the brake pedal to lock the conventional brake mechanism and use his or her foot to push the brake pedal upwardly to release the conventional brake mechanism. Accordingly, the vamp is easily to be damaged or scraped.

SUMMARY OF THE INVENTION

An objective of the invention is to provide a brake mechanism for a stroller. The brake mechanism has simple and convenient operation and high reliability. Furthermore, the brake mechanism can achieve one-step brake. When a user wants to lock or release the brake mechanism, he or she only has to stamp on the brake pedal, such that the vamp will not be scraped and then the problems of prior art is solved.

According to one embodiment, the invention provides a brake mechanism for a stroller. The stroller comprises a first support member and a first wheel. The first wheel has a first hub. The brake mechanism comprises a first wheel base, a ratchet, an operating member and a first engaging member. The first wheel base is connected to the first support member, and the first wheel is pivotally connected to the first wheel base. The ratchet is pivotally connected to the first wheel base. The ratchet comprises a first tooth-shaped structure, and the first tooth-shaped structure has a plurality of first and second engaging teeth arranged interlacedly. The operating member is pivotally connected to the first wheel base and abuts against the ratchet. The first engaging member is pivotally connected to the first wheel base and capable of simultaneously engaging with one of the second engaging teeth of the ratchet and the first hub. When the operating member is pressed to drive the ratchet to rotate, the ratchet drives the first engaging member to move, so that the first engaging member is capable of selectively engaging with one of the first or second engaging teeth.

The ratchet further comprises a second tooth-shaped structure, the second tooth-shaped structure has a plurality of third engaging teeth, and a tooth depth of the first engaging tooth is less than a tooth depth of the second engaging tooth.

The brake mechanism further comprises a driving member connected to the operating member and movably disposed in the first wheel base. The driving member has a driving portion and a resilient portion, wherein the driving portion is selectively engaged with one of the third engaging teeth, and the resilient portion abuts against an inner wall of the operating member. When the operating is pressed, the resilient portion deforms elastically.

The first engaging member has a first engaging portion and a second engaging portion. When the first engaging portion is engaged with one of the first engaging teeth, the second engaging portion is released from the first hub. When the first engaging portion is engaged with one of the second engaging teeth, the second engaging portion is engaged with the first hub.

The brake mechanism further comprises a first resilient member, wherein one end of the first resilient member is connected to the operating member and another end of the first resilient member is connected to the first wheel base. When the operating member is pressed, the first resilient member is stretched. When the operating member is released, the first resilient member generates a pulling force to get the operating member back.

The brake mechanism further comprises a second resilient member, wherein one end of the second resilient member is connected to the first wheel base and another end of the second resilient member is connected to the first engaging member. When the first engaging portion is engaged with one of the first engaging teeth, the second resilient is stretched. When the first engaging portion is released from the first engaging tooth, the second resilient member generates a pulling force to make the first engaging portion engage with one of the second engaging teeth.

According to another embodiment, the stroller further comprises a second support member and a second wheel, the second wheel has a second hub, and the brake mechanism further comprises a second wheel base, a second engaging member and a connecting member. The second wheel base is connected to the second support member, and the second wheel is pivotally connected to the second wheel base. The second engaging member is pivotally connected to the second wheel base and has a third engaging portion. A first end of the connecting member is connected to the first engaging member, and a second end of the connecting member is connected to the second engaging member. When the first engaging portion is engaged with one of the first engaging teeth, the second engaging portion is released from the first hub and the third engaging portion is released from the second hub. When the first engaging portion is engaged with one of the second teeth, the second engaging portion is engaged with the first hub and the third engaging portion is engaged with the second hub.

The brake mechanism further comprises a third resilient member, wherein one end of the third resilient member is connected to the second wheel base and another end of the third resilient member is connected to the second engaging member. When the first engaging portion is engaged with one of the first engaging teeth, the second engaging member is pulled by the connecting member and the first engaging member, such that the third resilient member is stretched. When the first engaging portion is released from the first engaging tooth, the connecting member is also released and the third resilient member generates a pulling force to make the third engaging portion engage with the second hub.

The first engaging member has an engaging hole, and the first wheel base has a guiding hole. The second end of the connecting member passes through the engaging hole and the guiding hole, such that the first end of the connecting member is restrained by the engaging hole.

A width of the first end of the connecting member is larger than diameters of the engaging hole and the guiding hole, and a width of the second end of the connecting member is less than diameters of the engaging hole and the guiding hole.

The second engaging member has a through hole and a circular hole. The through hole communicates with the circular hole. The second end of the connecting member passes through the through hole and then engages with the circular hole.

Another objective of the invention is to provide a brake mechanism for a stroller. The brake mechanism of the invention utilizes a connecting member to drive brakes of two opposite wheels simultaneously.

According to another embodiment, the invention provides a brake mechanism for a stroller. The stroller comprises a first support member, a second support member, a first wheel having a first hub, and a second wheel having a second hub. The brake mechanism comprises a first wheel base, a second wheel base, a ratchet, an operating member, a first engaging member, a second engaging member and a connecting member. The first wheel base is connected to the first support member, and the first wheel is pivotally connected to the first wheel base. The second wheel base is connected to the second support member, and the second wheel is pivotally connected to the second wheel base. The ratchet is pivotally connected to the first wheel base. The operating member is pivotally connected to the first wheel base and abuts against the ratchet. The first engaging member is pivotally connected to the first wheel base and movably abuts against the ratchet. The second engaging member is pivotally connected to the second wheel base. A first end of the connecting member is connected to the first engaging member and a second end of the connecting member is connected to the second engaging member. When the operating member is pressed to drive the ratchet to rotate, the ratchet drives the first engaging member and the connecting member to move and then the connecting member drives the second engaging member to move, so that the first engaging member and the second engaging member are capable of simultaneously engaging with the first hub and the second hub respectively.

According to the aforesaid embodiments, the brake mechanism of the invention has the following advantages and useful effects. When a user wants to lock or release the brake mechanism, he or she only has to stamp on the brake pedal (i.e. the aforesaid operating member), such that the vamp will not be scraped. Furthermore, since the brake mechanism of the invention utilizes the connecting member to drive the left and right wheels (i.e. the aforesaid first and second wheels) simultaneously, the user only has to stamp on the brake pedal so as to achieve one-step brake. In this way, the operation of the brake mechanism for the stroller will get simple and convenient. For example, the user can operate the brake mechanism of the invention to brake the left and right wheels fast and simultaneously, so that the stroller will not sway, rotate or topple over under a critical situation. Accordingly, the invention can ensure the security of the infant or child seated in the stroller.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is an assembly diagram illustrating the second resilient member, the first wheel base and the first engaging member shown in

FIG. 3.

DETAILED DESCRIPTION

Figure 1:
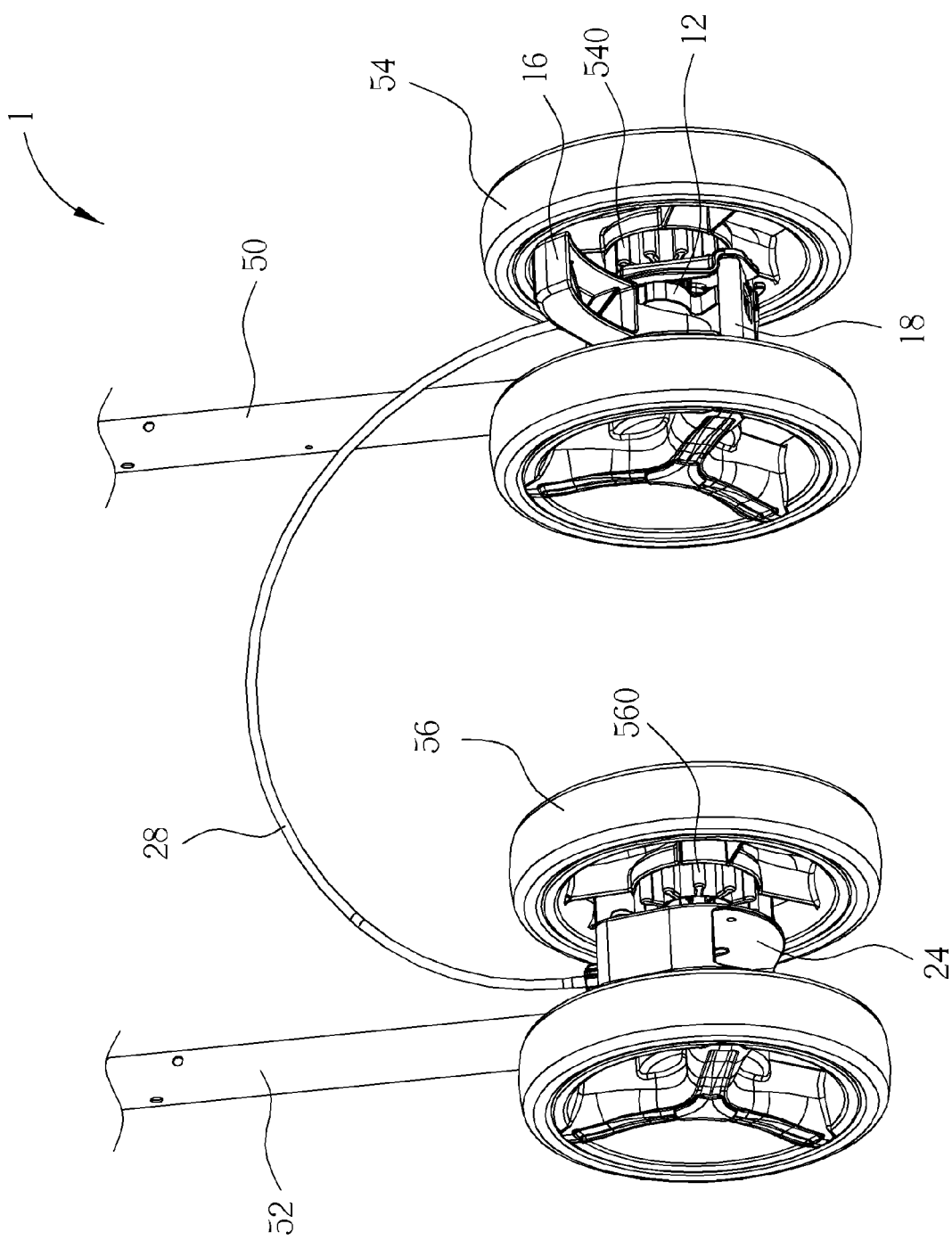
FIG. 1 is an assembly diagram illustrating a first wheel, a second wheel and a brake mechanism according to one embodiment of the invention.
Figure 2:
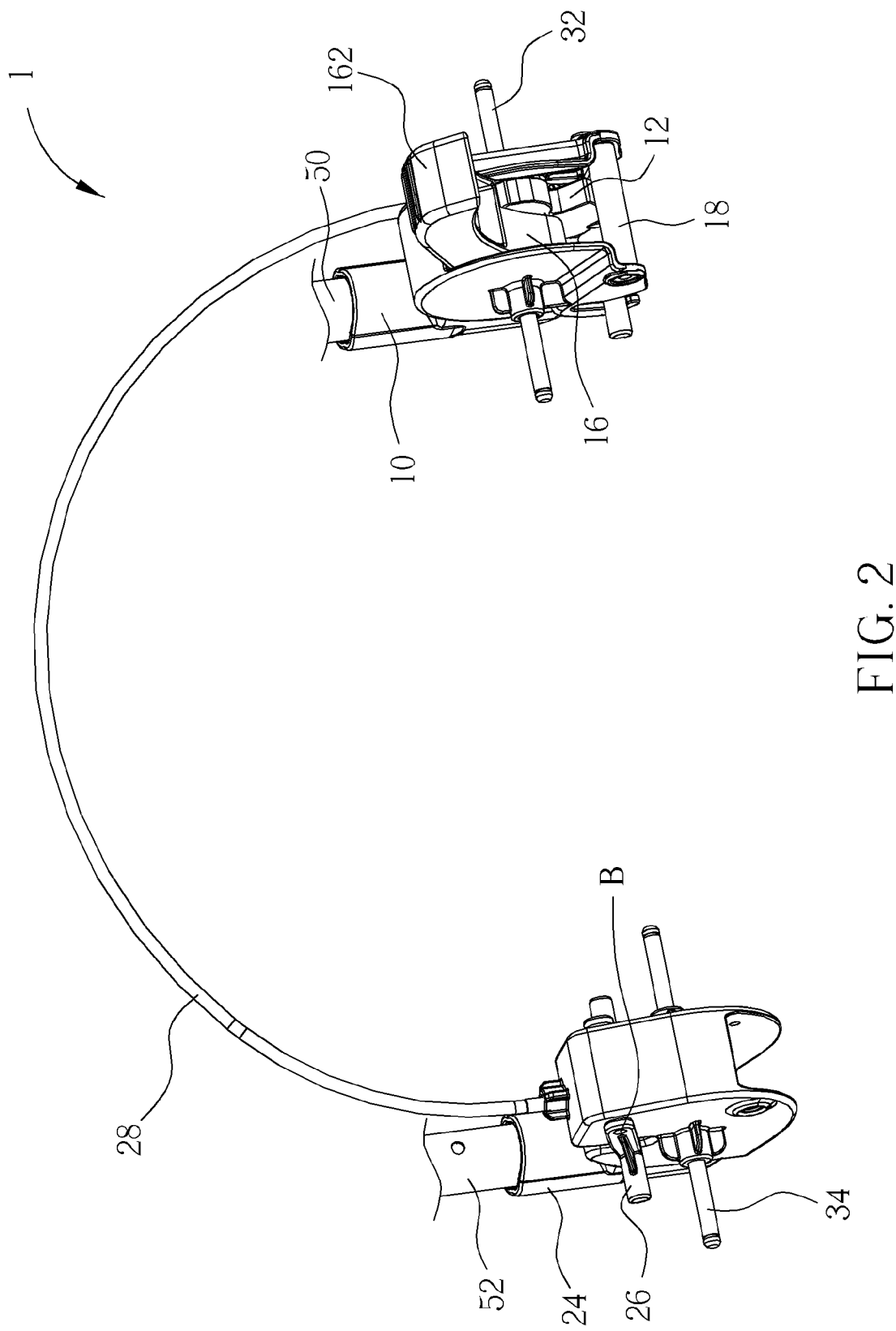
FIG. 2 is a schematic diagram illustrating the brake mechanism shown in FIG. 1.
Figure 3:
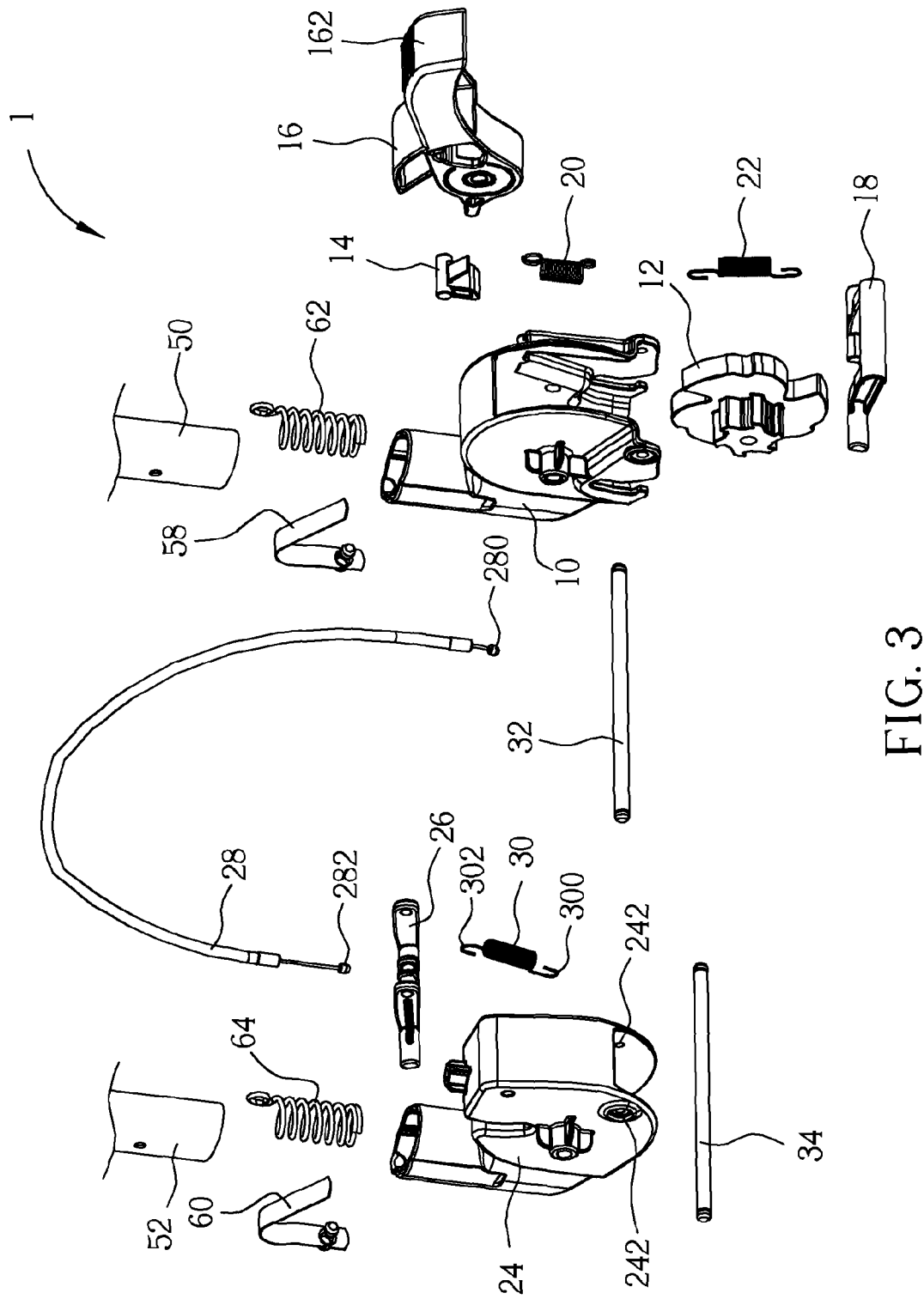
FIG. 3 is an exploded diagram illustrating the brake mechanism shown in FIG. 2.

Please refer to FIGS. 1 to 3. According to one embodiment of the invention, a brake mechanism 1 is disposed on a first support member 50 and a second support member 52 of a stroller. The stroller further comprises a first wheel 54 and a second wheel 56. In practical applications, the first support member 50 and the second support member 52 can be rear legs of the stroller. The first wheel 54 has a first hub 540, and the second wheel 56 has a second hub 560. The brake mechanism 1 comprises a first wheel base 10, a ratchet 12, a driving member 14, an operating member 16, a first engaging member 18, a first resilient member 20, a second resilient member 22, a second wheel base 24, a second engaging member 26, a connecting member 28 and a third resilient member 30. The first resilient member 20, the second resilient member 22 and the third resilient member 30 can be a spring respectively.

In this embodiment, the first wheel base 10 is pivotally connected to the first wheel 54 by a first wheel axle 32, and the second wheel base 24 is pivotally connected to the second wheel 56 by a second wheel axle 34. Furthermore, the first wheel base 10 is detachably connected to the first support member 50 by a first elastic plate 58, and the second wheel base 24 is detachably connected to the second support member 52 by a second elastic plate 60. Moreover, a first cushion spring 62 is disposed between the first support member 50 and the first wheel base 10, and a second cushion spring 64 is disposed between the second support member 52 and the second wheel base 24, so as to absorb impact while the stroller collides with a barrier.

Figure 4:
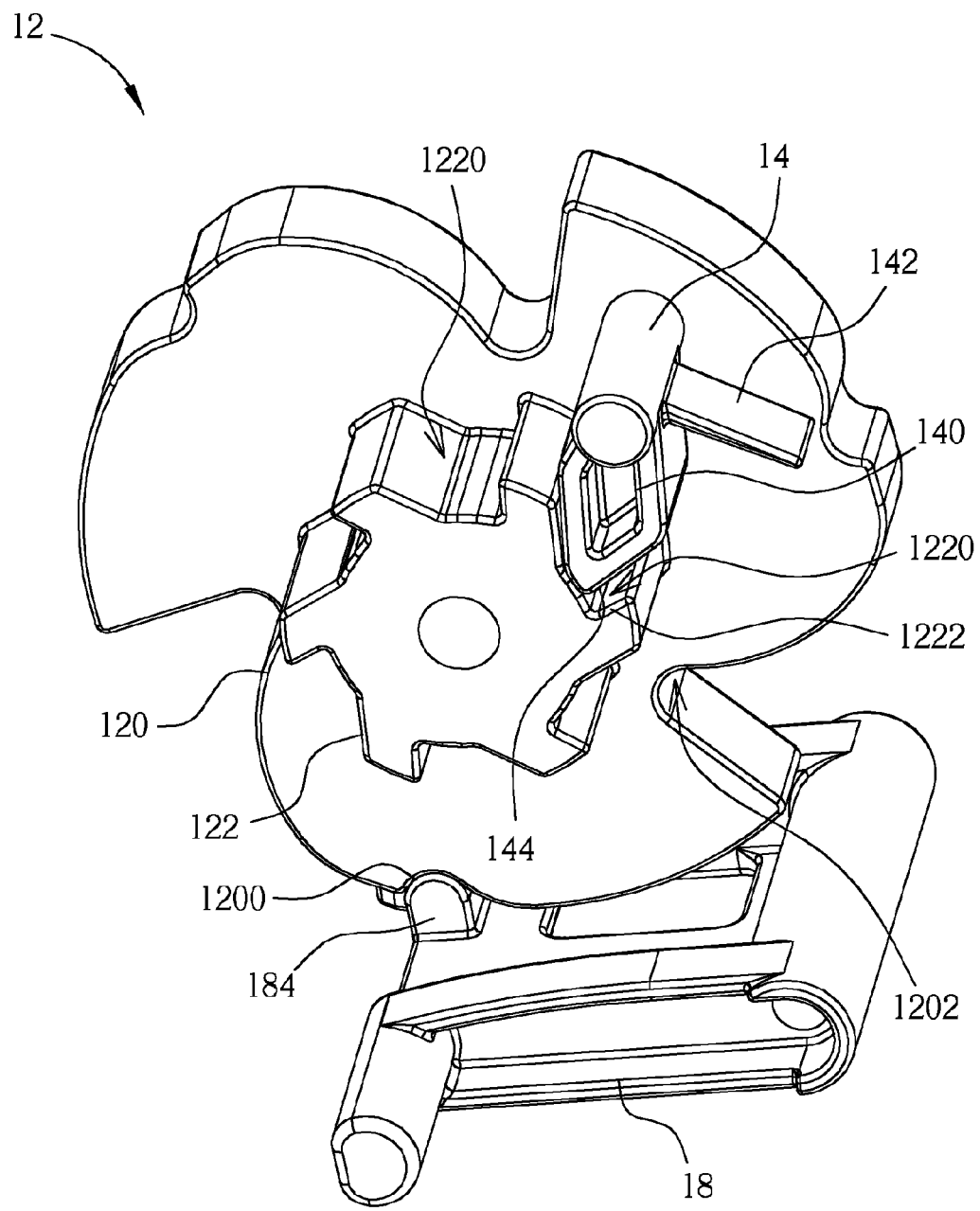
FIG. 4 is an assembly diagram illustrating the ratchet, the driving member and the first engaging member shown in FIG. 3.

Please refer to FIGS. 4 to 7. The ratchet 12 is also pivotally connected to the first wheel base 10 by the first wheel axle 32. The ratchet 12 comprises a first tooth-shaped structure 120 and a second tooth-shaped structure 122. The first tooth-shaped structure 120 has a plurality of first and second engaging teeth 1200 and 1202. The second tooth-shaped structure 122 has a plurality of third engaging teeth 1220. As shown in FIG. 4, the first tooth-shaped structure 120 has three first engaging teeth 1200 and three second engaging teeth 1202, and the second tooth-shaped structure 122 has six third engaging teeth 1220, wherein the first and second teeth 1200 and 1202 are arranged interlacedly. It should be noted that the number of the first, second and third engaging teeth 1200, 1202 and 1220 can be determined based on practical applications. In addition, a tooth depth of the first engaging tooth 1200 is less than a tooth depth of the second engaging tooth 1202.

Figure 5:
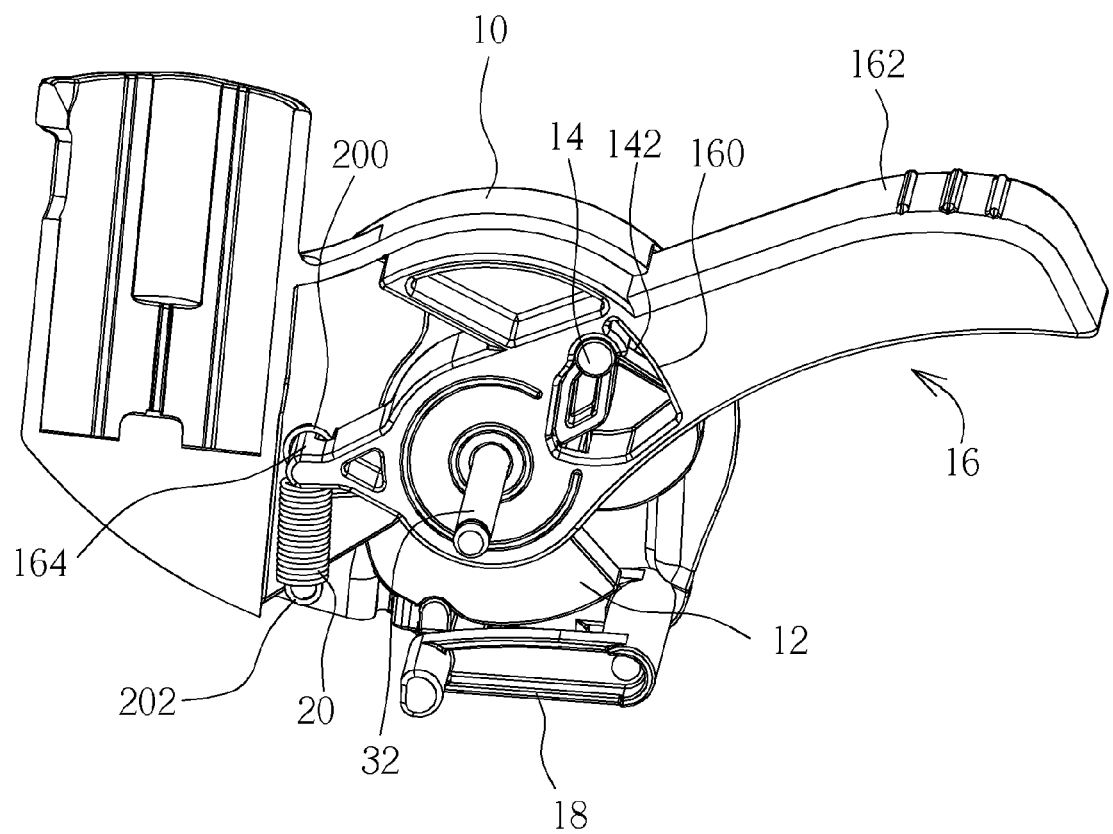
FIG. 5 is a schematic diagram illustrating the operating member disposed on the ratchet and the driving member shown in FIG. 3.

As shown in FIGS. 4 and 5, the driving member 14 has a driving portion 140 and a resilient portion 142. The driving member 14 is disposed in an accommodating space of the operating member 16 and movably disposed in the first wheel base 10, such that the driving member 14 can move along with the operating member 16. The driving portion 140 is selectively engaged with one of the third engaging teeth 1220. Furthermore, the operating member 16 is disposed on the ratchet 12 and pivotally connected to the first wheel base 10 by the first wheel axle 32, such that the operating 16 along with the ratchet 12 can rotate with respect to the first wheel axle 32. When the driving member 14 is disposed in the operating member 16, the driving portion 140 is selectively engaged with one of the third engaging teeth 1220, and the resilient portion 142 of the driving member 14 abuts against an inner wall 160 of the accommodating space (not shown) of the operating member 16. When the operating member 16 is pressed, the driving member 14 will move correspondingly, so that the driving portion 140 will push the ratchet 12 to rotate and then be pushed by another adjacent third engaging tooth 1220 due to the rotation of the ratchet 12. Then, the resilient portion 142 deforms elastically so as to absorb the pushing force while the adjacent third engaging tooth 1220 pushes the driving portion 140. The operating member 16 has an operating portion 162 exposed out of the first wheel base 10. One end 200 of the first resilient member 20 is connected to a protruding portion 164 of the operating member 16 and another end 202 is connected to the first wheel base 10. When the operating member 16 is pressed, the first resilient member 20 is stretched. When the operating member 16 is released, the first resilient member 20 generates a pulling force to get the operating member 16 back.

Figure 7:
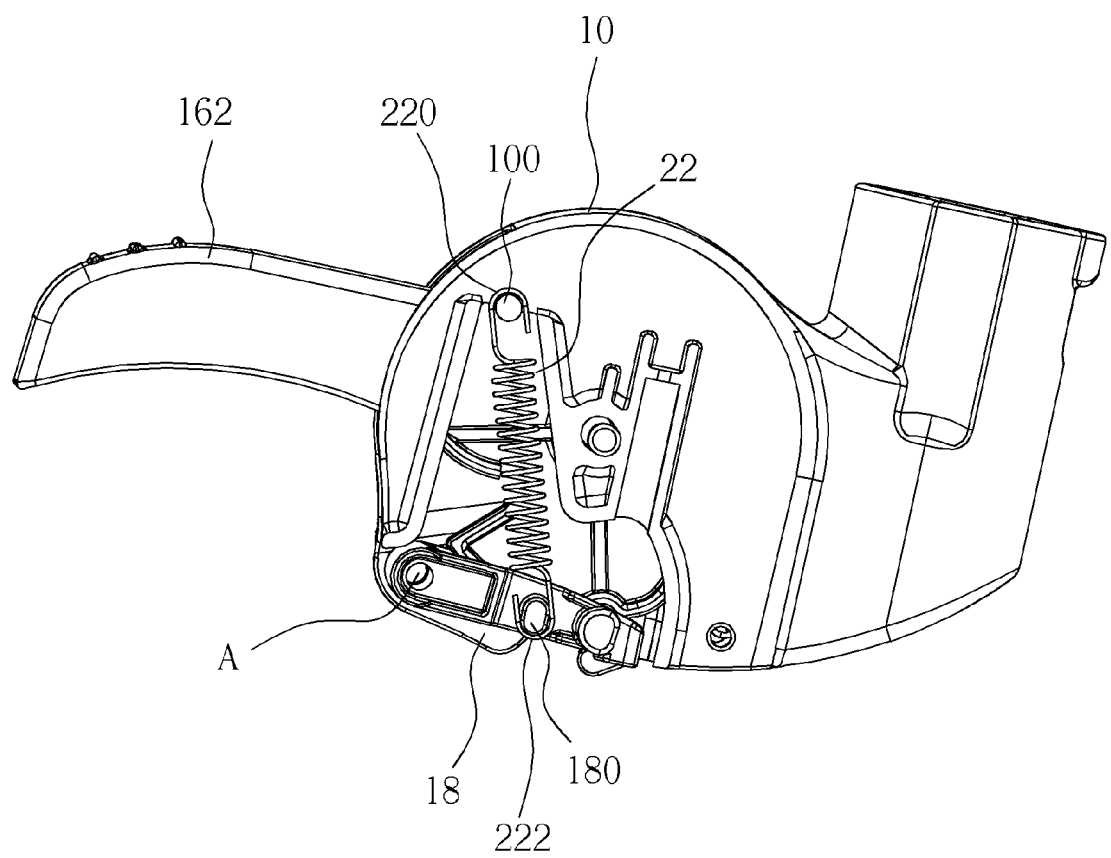

As shown in FIG. 7, one end 220 of the second resilient member 22 is connected to an engaging rib 100 on a back side of the first wheel base 10 and another end 222 is connected to a protruding portion 180 of the first engaging member 18. Furthermore, a second end 282 of the connecting member 28 (shown in FIG. 3) passes through an engaging hole 182 of the first engaging member 18 and a guiding hole 102 of the first wheel base 10, such that a first end 280 of the connecting member 28 is restrained by the engaging hole 182. In practical applications, a width of the first end 280 of the connecting member 28 can be larger than diameters of the engaging hole 182 and the guiding hole 102, and a width of the second end 282 can be less than diameters of the engaging hole 182 and the guiding hole 102.

Figure 6:
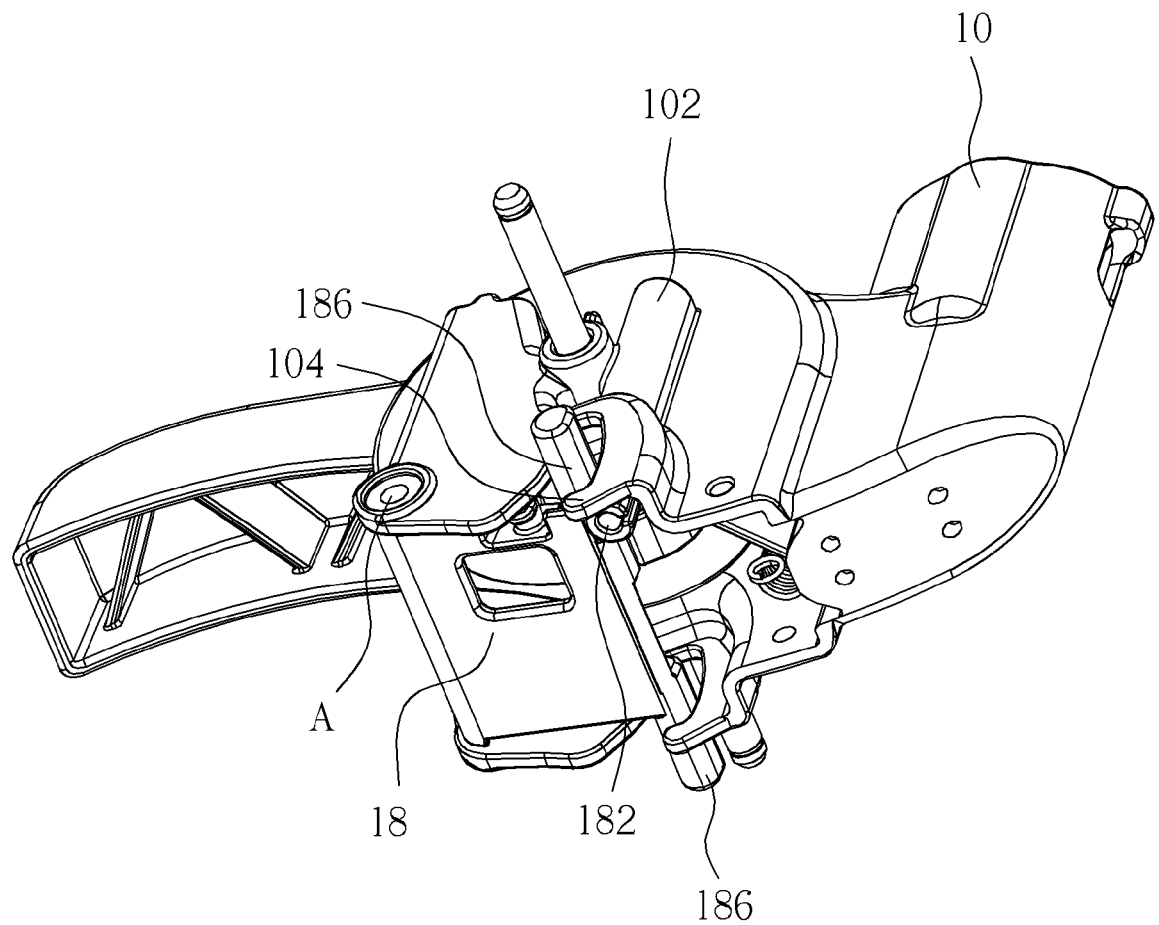
FIG. 6 is a schematic diagram illustrating FIG. 5 in another view angle.

As shown in FIGS. 4 and 6, the first engaging member 18 has a first engaging portion 184 and a second engaging portion 186. The first and second engaging portions 184 and 186 are located at the same side of the first engaging member 18. The first engaging portion 184 can be selectively engaged with the first or second engaging tooth 1200 or 1202 of the ratchet 12. When the first engaging portion 184 is engaged with the first engaging tooth 1200 of the ratchet 12, the second engaging portion 186 is engaged with an engaging hook of the first wheel base 10. When the first engaging portion 184 is engaged with the second engaging tooth 1202 of the ratchet 12, the second engaging portion 186 is disengaged from the engaging hook 104 of the first wheel base 10. In addition, the first engaging member 18 can be pivotally connected to the first wheel base 10 at a point A by a rivet member (not shown), such that the first engaging member 18 can pivot on the point A.

Figure 8:
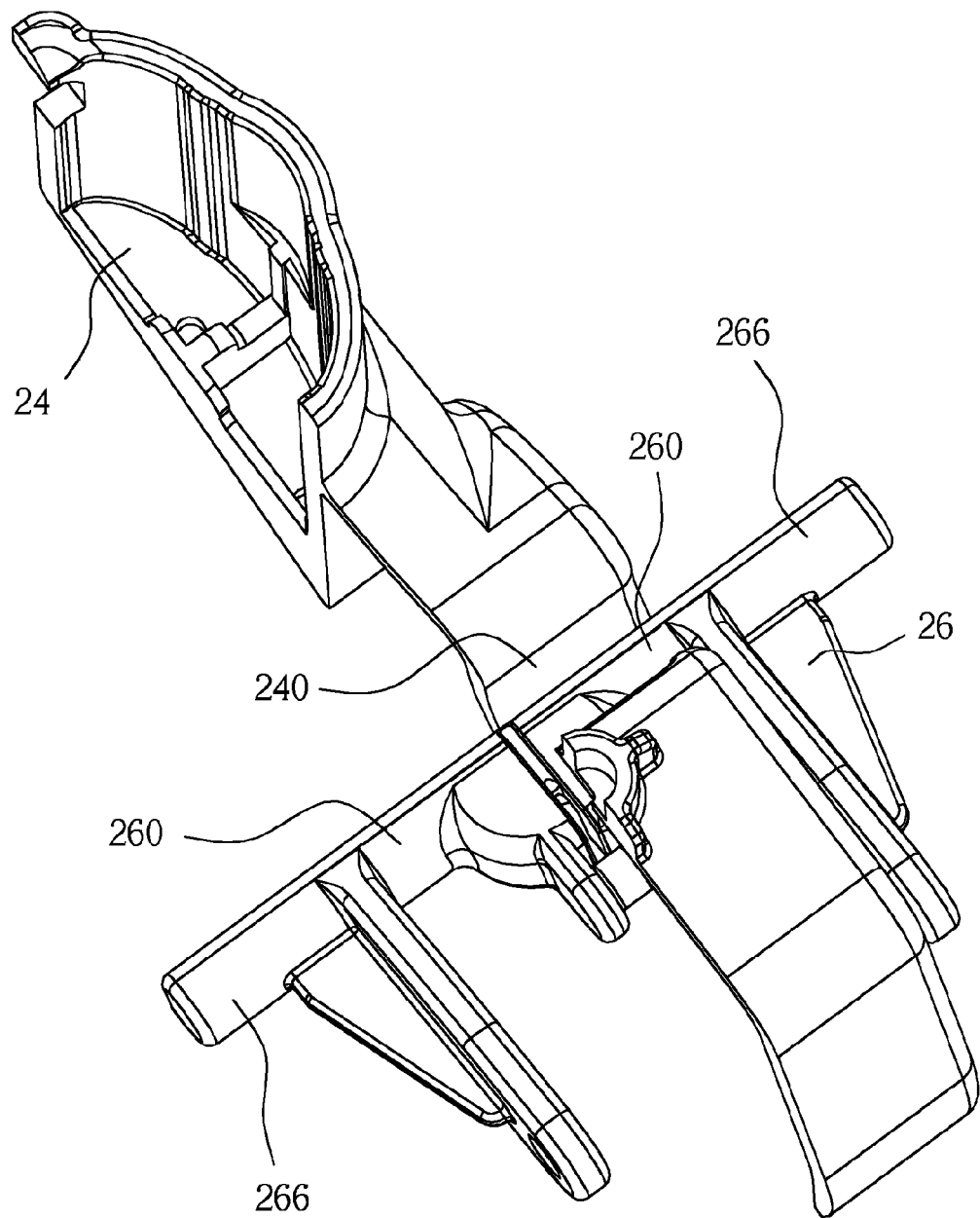
FIG. 8 is an assembly diagram illustrating the second wheel base and the second engaging member shown in FIG. 3.
Figure 9:
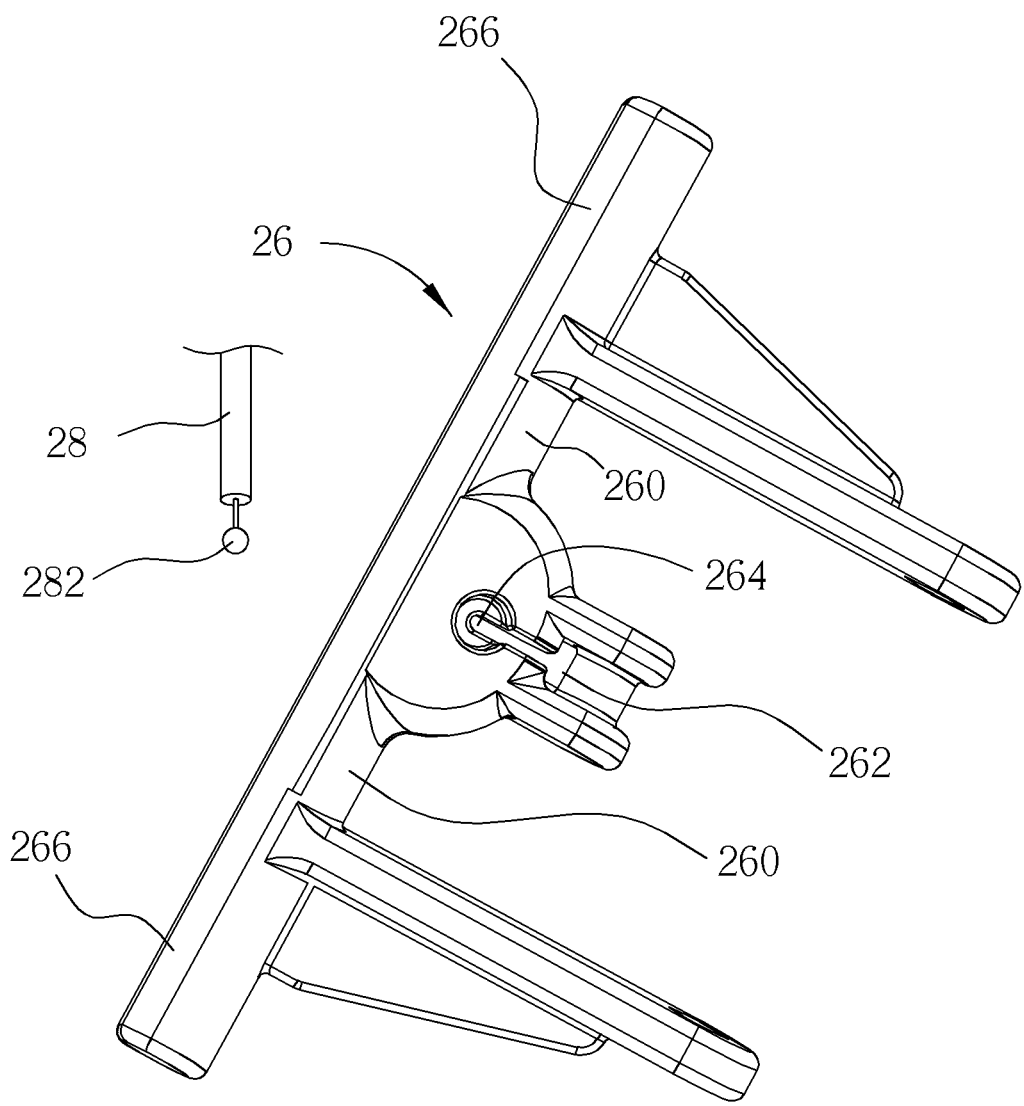
FIG. 9 is a schematic diagram illustrating the connecting member and the second engaging member shown in FIG. 3 in another view angle.
Figure 10:
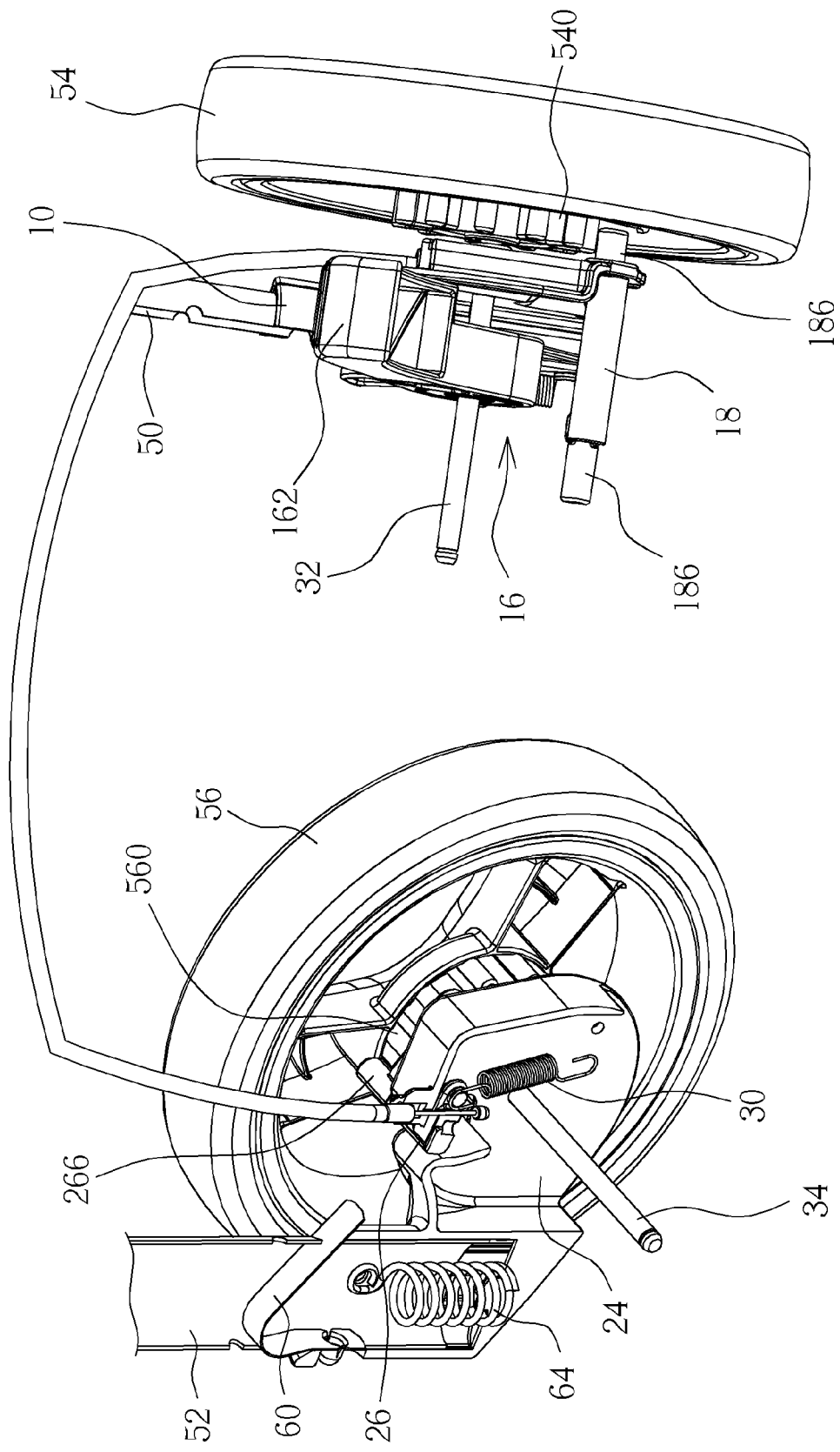
FIG. 10 is a perspective view illustrating the brake mechanism shown in FIG. 1 situated at a releasing state.
Figure 11:
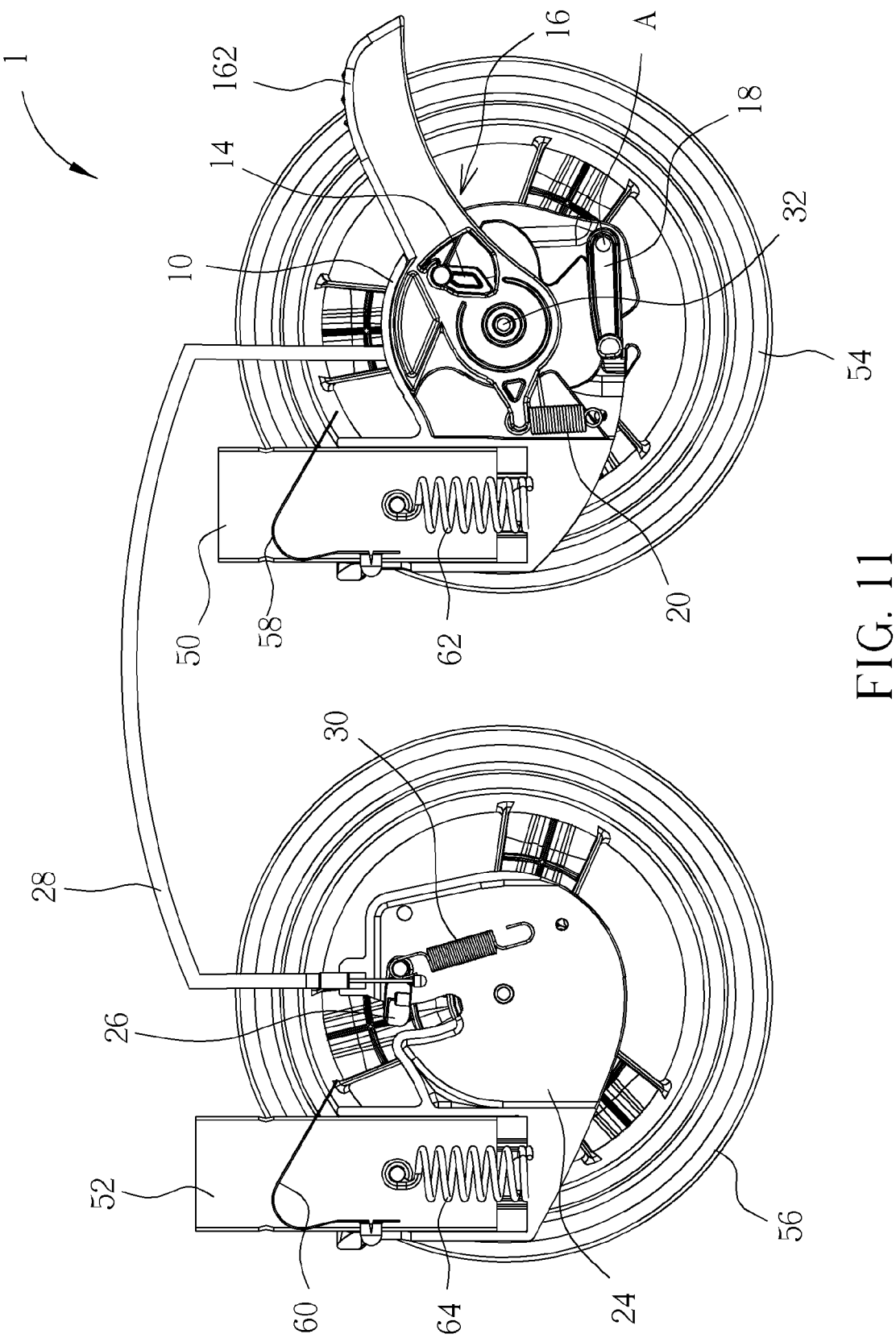
FIG. 11 is a sectional view illustrating the brake mechanism shown in FIG. 1 situated at a releasing state.
Figure 12:
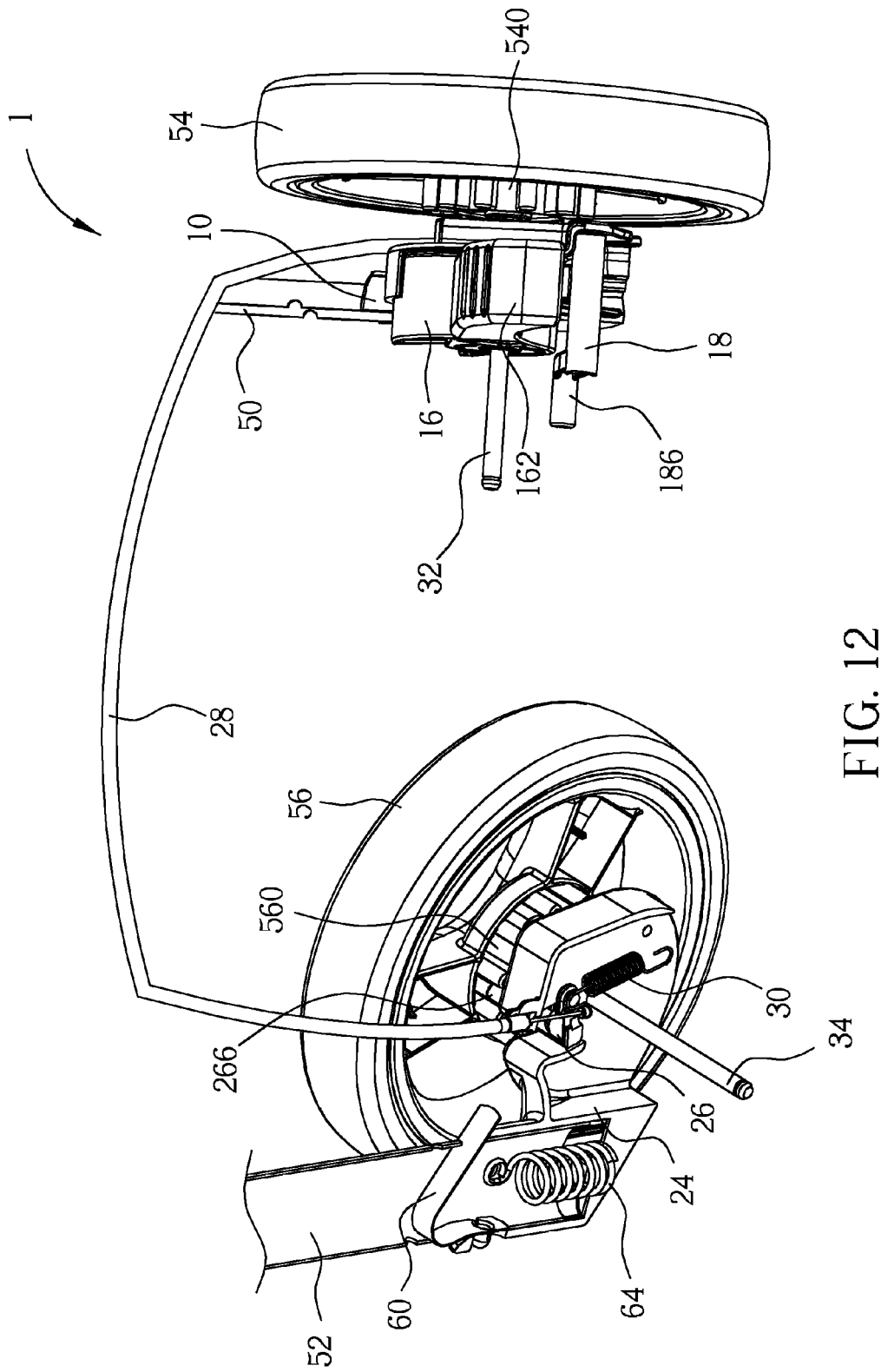
FIG. 12 is a perspective view illustrating the brake mechanism shown in FIG. 1 situated at a locking state.
Figure 13:
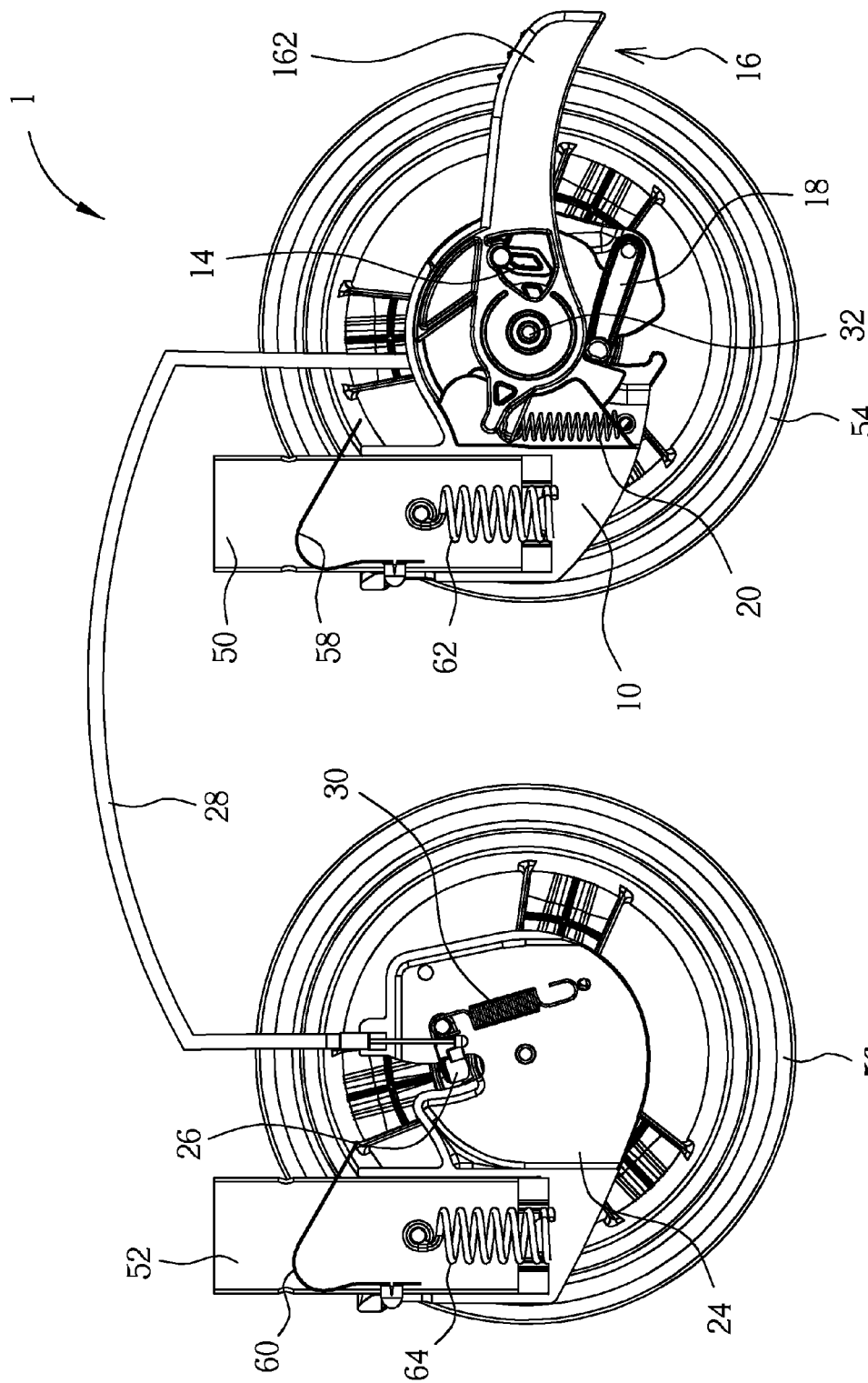
FIG. 13 is a sectional view illustrating the brake mechanism shown in FIG. 1 situated at a locking state.

Please refer to FIGS. 8 and 9. The second engaging member 26 is pivotally connected to the second wheel base at a point B (shown in FIG. 2) by a rivet member (not shown), such that the second engaging member 26 can pivot on the point B. The second end 282 of the connecting member 28 passes through a through hole 262 of the second engaging member 26 and then engages with a circular hole 264. One end 300 of the third resilient member 30 is connected to the second wheel base 24 by hooking a rivet (not shown) and another end 302 is connected to the second engaging member 26. The aforesaid rivet passes through a rivet hole 242 of the second wheel base 24 (shown in FIG. 3). There are two engaging portions 260 on opposite sides of the second engaging member 26. When the operating member 16 is operated by a user, the engaging portions 260 can be engaged with a recess 240 of the second wheel base 24 or be disengaged from the recess 240 due to an elastic force generated by the third resilient member 30.

Please refer to FIGS. 4 and 10-13. When a user wants to operate the brake mechanism 1 from a releasing state (shown in FIGS. 10 and 11) to a locking state (shown in FIGS. 12 and 13), he or she has to stamp on the operating portion 162 of the operating member 16 downwardly. The operating member 16 will pivot on the first wheel axle 32 and drive the driving member 14 to move downwardly. When the driving member 14 moves downwardly, a lower surface 144 of the driving member 14 (shown in FIG. 4) will abut against a lower tooth surface 1222 of the third engaging tooth 1220 (shown in FIG. 4) and push the ratchet 12 to rotate clockwise. At this time, due to the rotation of the ratchet 12, another adjacent third engaging tooth 1220 will push the other surface of the driving member 14 so as to push the driving member 14 to move. Thus, the resilient member 142 opposite to the driving portion 140 will deform elastically, so that the driving portion 140 of the driving member 14 can move toward the resilient portion 142 until the driving portion 140 crosses the current third engaging tooth 1220 and engages with next third engaging tooth 1220 due to an elastic force generated by the resilient portion 142. Afterward, the first engaging portion 184 of the first engaging member 18 is disengaged from the first engaging tooth 1200 (i.e. the shallow tooth shown in FIG. 4) of the ratchet 12 while the ratchet 12 rotates. At this time, the stretched second resilient member 22 generates a pulling force for pulling the first engaging member 18 to rotate upwardly with respect to the point A, such that the first engaging portion 184 of the first engaging member 18 will be engaged with the second engaging tooth 1202 (i.e. the deep tooth shown in FIG. 4), and the second engaging portion 186 of the first engaging member 18 will be engaged with the first hub 540 of the first wheel 54. Consequently, the first wheel 54 is braked and locked.

When the first engaging member 18 rotates upwardly, the first end 280 of the connecting member 28 also moves upwardly. At this time, the stretched third resilient member 30 generates a pulling force for pulling the second engaging member 26 to rotate downwardly with respect to the point B (shown in FIG. 2), such that the third engaging portion 266 of the second engaging member 26 is engaged with the second hub 560 of the second wheel 56. Consequently, the second wheel 56 is braked and locked. After locking both sides of the brake mechanism 1, the first resilient member 20 will generate an elastic force to get the operating member 16 back, and the resilient portion 142 (shown in FIG. 4) of the driving member 14 will also recover.

On the other hand, when a user wants to operate the brake mechanism 1 from the locking state (shown in FIGS. 12 and 13) to the releasing state (shown in FIGS. 10 and 11), he or she also has to stamp on the operating portion 162 of the operating member 16 downwardly. The operating member 16 will drive the driving member 14 to move downwardly. When the driving member 14 moves downwardly, the lower surface 144 of the driving member 14 (shown in FIG. 4) will abut against a lower tooth surface 1222 of the third engaging tooth 1220 (shown in FIG. 4) and push the ratchet 12 to rotate clockwise. At this time, due to the rotation of the ratchet 12, another adjacent third engaging tooth 1220 will push the other surface of the driving member 14 so as to push the driving member 14 to move. Thus, the resilient member 142 opposite to the driving portion 140 will deform elastically, so that the driving portion 140 of the driving member 14 can move toward the resilient portion 142 until the driving portion 140 crosses the current third engaging tooth 1220 and engages with next third engaging tooth 1220 due to an elastic force generated by the resilient portion 142. Afterward, the first engaging portion 184 of the first engaging member 18 is disengaged from the second engaging tooth 1202 (i.e. the deep tooth shown in FIG. 4) of the ratchet 12 while the ratchet 12 rotates. At this time, when the ratchet 12 rotates continuously and the first engaging portion 184 of the first engaging member 18 is located at next adjacent first engaging tooth 1200, the second resilient member 22 generates a pulling force for pulling the first engaging member 18 to rotate with respect to the point A, such that the first engaging portion 184 of the first engaging member 18 will be engaged with the first engaging tooth 1200 (i.e. the shallow tooth shown in FIG. 4). The second engaging portion 186 will be disengaged from the first hub 540 of the first wheel 54 while the first engaging member 18 rotates downwardly. Consequently, the first wheel 54 is released.

When the first engaging member 18 rotates downwardly, the first end 280 of the connecting member 28 also moves downwardly. The connecting member 28 will pull the second engaging member 26 to rotate upwardly with respect to the point B (shown in FIG. 2), such that the third engaging portion 266 of the second engaging member 26 is disengaged from the second hub 560 of the second wheel 56. Consequently, the second wheel 56 is released. After releasing both sides of the brake mechanism 1, the first resilient member 20 will generate an elastic force to get the operating member 16 back, and the resilient portion 142 (shown in FIG. 4) of the driving member 14 will also recover.

According to the aforesaid embodiments, the brake mechanism of the invention has the following advantages and useful effects. When a user wants to lock or release the brake mechanism, he or she only has to stamp on the brake pedal (i.e. the aforesaid operating member), such that the vamp will not be scraped. Furthermore, since the brake mechanism of the invention utilizes the connecting member to drive brakes of the left and right wheels (i.e. the aforesaid first and second wheels) simultaneously, the user only has to stamp on the brake pedal so as to achieve one-step brake. In this way, the operation of the brake mechanism for the stroller will get simple and convenient. For example, the user can operate the brake mechanism of the invention to brake the left and right wheels fast and simultaneously, so that the stroller will not sway, rotate or topple over under a critical situation. Accordingly, the invention can ensure the security of the infant or child seated in the stroller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A brake mechanism for a stroller, the stroller comprising a first support member and a first wheel, the first wheel having a first hub, the brake mechanism comprising:
   a first wheel base connected to the first support member, the first wheel being pivotally connected to the first wheel base;
   a ratchet pivotally connected to the first wheel base, the ratchet comprising a first tooth-shaped structure and a second tooth-shaped structure, the first tooth-shaped structure having a plurality of first and second engaging teeth arranged interlacedly, a tooth depth of the first engaging tooth being less than a tooth depth of the second engaging tooth, the second tooth-shaped structure having a plurality of third engaging teeth;
   an operating member pivotally connected to the first wheel base, the operating member abutting against the ratchet; and
   a first engaging member pivotally connected to the first wheel base and capable of simultaneously engaging with one of the second engaging teeth of the ratchet and the first hub;
   wherein when the operating member is pressed to drive the ratchet to rotate, the ratchet drives the first engaging member to move, so that the first engaging member is capable of engaging with one of the first or second engaging teeth.

2. The brake mechanism of claim 1, further comprising a driving member connected to the operating member and movably disposed in the first wheel base, the driving member having a driving portion and a resilient portion, the driving portion being engaged with one of the third engaging teeth, the resilient portion abutting against an inner wall of the operating member, wherein when the operating member is pressed, the driving portion drives the ratchet to rotate and the resilient portion deforms elastically.

3. The brake mechanism of claim 1, wherein the first engaging member has a first engaging portion and a second engaging portion, when the first engaging portion is engaged with one of the first engaging teeth, the second engaging portion is released from the first hub; and when the first engaging portion is engaged with one of the second engaging teeth, the second engaging portion is engaged with the first hub.

4. The brake mechanism of claim 3, the stroller further comprising a second support member and a second wheel, the second wheel having a second hub, the brake mechanism further comprising:
   a second wheel base connected to the second support member, the second wheel being pivotally connected to the second wheel base;
   a second engaging member pivotally connected to the second wheel base, the second engaging member having a third engaging portion; and
   a connecting member, a first end of the connecting member being connected to the first engaging member, a second end of the connecting member being connected to the second engaging member;
   wherein when the first engaging portion is engaged with one of the first engaging teeth, the second engaging portion is released from the first hub and the third engaging portion is released from the second hub; and when the first engaging portion is engaged with one of the second teeth, the second engaging portion is engaged with the first hub and the third engaging portion is engaged with the second hub.

5. The brake mechanism of claim 4, further comprising a third resilient member, one end of the third resilient member being connected to the second wheel base and another end of the third resilient member being connected to the second engaging member, wherein when the first engaging portion is engaged with one of the first engaging teeth, the second engaging member is pulled by the connecting member and the first engaging member, such that the third resilient member is stretched; and when the first engaging portion is released from the first engaging tooth, the connecting member is also released and the third resilient member generates a pulling force to make the third engaging portion engage with the second hub.

6. The brake mechanism of claim 4, wherein the first engaging member has an engaging hole, the first wheel base has a guiding hole, the second end of the connecting member passes through the engaging hole and the guiding hole, such that the first end of the connecting member is restrained by the engaging hole.

7. The brake mechanism of claim 6, wherein a width of the first end of the connecting member is larger than diameters of the engaging hole and the guiding hole, and a width of the second end of the connecting member is less than diameters of the engaging hole and the guiding hole.

8. The brake mechanism of claim 4, wherein the second engaging member has a through hole and a circular hole, the through hole communicates with the circular hole, the second end of the connecting member passes through the through hole and then engages with the circular hole.

9. The brake mechanism of claim 1, further comprising a first resilient member, one end of the first resilient member being connected to the operating member and another end of the first resilient member being connected to the first wheel base, wherein when the operating member is pressed, the first resilient member is stretched; and when the operating member is released, the first resilient member generates a pulling force to get the operating member back.

10. The brake mechanism of claim 1, further comprising a second resilient member, one end of the second resilient member being connected to the first wheel base and another end of the second resilient member being connected to the first engaging member, wherein when the first engaging portion is engaged with one of the first engaging teeth, the second resilient is stretched; and when the first engaging portion is released from the first engaging tooth, the second resilient member generates a pulling force to make the first engaging portion engage with one of the second engaging teeth.

11. A brake mechanism for a stroller, the stroller comprising a first support member, a second support member, a first wheel having a first hub, and a second wheel having a second hub, the brake mechanism comprising:
a first wheel base connected to the first support member, the first wheel being pivotally connected to the first wheel base;
a second wheel base connected to the second support member, the second wheel being pivotally connected to the second wheel base;
a ratchet pivotally connected to the first wheel base, the ratchet comprising a first tooth-shaped structure and a second tooth-shaped structure, the first tooth-shaped structure having a plurality of first and second engaging teeth arranged interlacedly, a tooth depth of the first engaging tooth being less than a tooth depth of the second engaging tooth, the second tooth-shaped structure having a plurality of third engaging teeth;
an operating member pivotally connected to the first wheel base, the operating member abutting against the ratchet;
a first engaging member pivotally connected to the first wheel base and capable of engaging with one of the first or second engaging teeth;
a second engaging member pivotally connected to the second wheel base; and
a connecting member, a first end of the connecting member being connected to the first engaging member and a second end of the connecting member being connected to the second engaging member;
wherein when the operating member is pressed to drive the ratchet to rotate, the ratchet drives the first engaging member and the connecting member to move and then the connecting member drives the second engaging member to move, so that the first engaging member and the second engaging member are capable of simultaneously engaging with the first hub and the second hub respectively.

12. The brake mechanism of claim 11, further comprising a first resilient member, one end of the first resilient member being connected to the operating member and another end of the first resilient member being connected to the first wheel base, wherein when the operating member is pressed, the first resilient member is stretched; and when the operating member is released, the first resilient member generates a pulling force to get the operating member back.

13. The brake mechanism of claim 11, further comprising a driving member connected to the operating member and movably disposed in the first wheel base, the driving member having a driving portion and a resilient portion, the driving portion being engaged with one of the third engaging teeth, the resilient portion abutting against an inner wall of the operating member, wherein when the operating member is pressed, the driving portion drives the ratchet to rotate and the resilient portion deforms elastically.

14. The brake mechanism of claim 11, wherein the first engaging member has a first engaging portion and a second engaging portion, when the first engaging portion is engaged with one of the first engaging teeth, the second engaging portion is released from the first hub; and when the first engaging portion is engaged with one of the second engaging teeth, the second engaging portion is engaged with the first hub.

15. The brake mechanism of claim 14, further comprising a second resilient member, one end of the second resilient member being connected to the first wheel base and another end of the second resilient member being connected to the first engaging member, wherein when the first engaging portion is engaged with one of the first engaging teeth, the second resilient is stretched; and when the first engaging portion is released from the first engaging tooth, the second resilient member generates a pulling force to make the first engaging portion engage with one of the second engaging teeth.

16. The brake mechanism of claim 14, wherein the second engaging member has a third engaging portion, when the first engaging portion is engaged with one of the first engaging teeth, the second engaging portion is released from the first hub and the third engaging portion is released from the second hub; and when the first engaging portion is engaged with one of the second teeth, the second engaging portion is engaged with the first hub and the third engaging portion is engaged with the second hub.

17. The brake mechanism of claim 16, further comprising a third resilient member, one end of the third resilient member being connected to the second wheel base and another end of the third resilient member being connected to the second engaging member, wherein when the first engaging portion is engaged with one of the first engaging teeth, the second engaging member is pulled by the connecting member and the first engaging member, such that the third resilient member is stretched; and when the first engaging portion is released from the first engaging tooth, the connecting member is also released and the third resilient member generates a pulling force to make the third engaging portion engage with the second hub.

* * * * *